(12) United States Patent
Ross

(10) Patent No.: US 11,059,602 B1
(45) Date of Patent: *Jul. 13, 2021

(54) SAFETY SYSTEM WITH PROJECTABLE WARNING INDICIA

(71) Applicant: Stan W. Ross, Scandia, MN (US)

(72) Inventor: Stan W. Ross, Scandia, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/559,176

(22) Filed: Sep. 3, 2019

Related U.S. Application Data

(63) Continuation of application No. 15/957,700, filed on Apr. 19, 2018, now Pat. No. 10,399,700, which is a continuation of application No. 15/430,510, filed on Feb. 12, 2017, now Pat. No. 9,975,649, which is a continuation of application No. 14/609,260, filed on Jan. 29, 2015, now Pat. No. 9,567,102.

(60) Provisional application No. 61/933,252, filed on Jan. 29, 2014.

(51) Int. Cl.
| | |
|---|---|
| *B64D 47/02* | (2006.01) |
| *B64F 1/20* | (2006.01) |
| *B60Q 1/50* | (2006.01) |
| *B64D 45/00* | (2006.01) |
| *G01C 21/36* | (2006.01) |

(52) U.S. Cl.
CPC .............. *B64D 47/02* (2013.01); *B60Q 1/503* (2013.01); *B64D 45/00* (2013.01); *B64F 1/20* (2013.01); *G01C 21/365* (2013.01); *B60Q 2400/50* (2013.01); *B64D 2045/007* (2013.01)

(58) Field of Classification Search
CPC .. B64D 47/02; B64D 45/00; B64D 2045/007; B60Q 1/503; B60Q 2400/50; B64F 1/20; G01C 21/365

USPC .......................................................... 340/981
See application file for complete search history.

(56) References Cited

U.S. PATENT DOCUMENTS

| | | | | |
|---|---|---|---|---|
| 7,002,488 | B2 * | 2/2006 | Kohlmeier-Beckmann | ................ B64D 47/02 340/431 |
| 7,677,737 | B2 * | 3/2010 | Lonn | .................... H04N 9/3182 353/69 |
| 8,289,191 | B2 * | 10/2012 | Larcher | .................... B60Q 1/50 250/492.1 |
| 9,567,102 | B1 * | 2/2017 | Ross | ......................... B64F 1/20 |
| 9,944,405 | B2 * | 4/2018 | Mouton | ................ B64C 27/006 |
| 9,975,649 | B1 * | 5/2018 | Ross | ..................... B64D 45/00 |
| 10,399,700 | B2 * | 9/2019 | Ross | ..................... B64D 45/00 |
| 10,446,021 | B2 * | 10/2019 | Carrasco | ................ G08G 1/005 |
| 2007/0053195 | A1 | 3/2007 | Alberti | |
| 2013/0187785 | A1 * | 7/2013 | McIntosh | .............. B66F 17/006 340/686.6 |
| 2015/0145698 | A1 * | 5/2015 | Werner | .................. H05B 47/19 340/928 |

(Continued)

*Primary Examiner* — John A Tweel, Jr.
(74) *Attorney, Agent, or Firm* — Underwood & Associates, LLC

(57) ABSTRACT

A safety system includes an apparatus-mounted projector capable of projecting a warning image onto a designated danger zone about a dangerous implement of the apparatus. The projector is in signal communication with an electronic control module configured to control the warning image depending on a measured or received operational state of the apparatus implement. The projected warning image can include static, dynamic, or static and dynamic image elements depending on the measured or received operational state of the implement.

20 Claims, 7 Drawing Sheets

(56) References Cited

U.S. PATENT DOCUMENTS

| | | | |
|---|---|---|---|
| 2015/0203023 A1* | 7/2015 | Marti | B60Q 1/00 340/425.5 |
| 2016/0046289 A1* | 2/2016 | Elbs | B60W 30/095 701/49 |
| 2017/0210282 A1* | 7/2017 | Rodriguez Barros | G03B 21/00 |
| 2019/0161943 A1* | 5/2019 | Frank | E02F 9/264 |

* cited by examiner

US 11,059,602 B1

SAFETY SYSTEM WITH PROJECTABLE WARNING INDICIA

CROSS REFERENCE TO RELATED APPLICATIONS

This application is a continuation of U.S. Ser. No. 15/957,700, which is a continuation of U.S. Ser. No. 15/430,510 filed Feb. 12, 2017, now U.S. Pat. No. 9,975,649, which is a continuation of U.S. Ser. No. 14/609,260 filed on Jan. 29, 2015, now U.S. Pat. No. 9,567,102, which claims the benefit under 35 U.S.C. § 119(e)(1) of U.S. Ser. No. 61/933,252 titled "Safety System with Projectable Warning Indicia" filed on Jan. 29, 2014. Each of the foregoing provisional and non-provisional applications is expressly incorporated herein by reference.

TECHNICAL FIELD

This disclosure relates to systems and methods for projecting a warning image from a platform onto the surface of an identified danger zone.

BACKGROUND

Machinery and vehicles of almost all type can pose significant threats to the well-being of persons in their vicinity. Particularly dangerous areas include places where loud, heavy, mobile machinery are present such as construction sites and on airplane tarmacs or launching areas (e.g., on an aircraft carrier). In many cases, workers within such sites may wear protective hearing devices, either out of good practice or as mandated by their employer or a federal protection agency such as OSHA. While hearing protection devices can perform well for their intended function, in some cases they can remove one of the critical senses humans rely upon in perceiving danger.

Another particularly dangerous environment is one where threats are visually obscured or substantially invisible. For example, the spinning propeller of an airplane or the inlet side of a turbine jet engine can present a serious threat to anyone in the vicinity. In the former case, propellers can spin quickly enough that the blades become difficult to see, and in the latter case, turbine jet engines are capable of producing suction powerful enough to draw a person into the inlet. Such dangers are especially prevalent at night and in adverse weather conditions when perception can be further hindered.

SUMMARY

In general, safety systems configured to project warning images are disclosed. Such a system can include one or more optical projectors capable of projecting one or more warning images onto a designated or selected danger zone. The danger zone may be designated or selected on various surfaces, e.g., concrete, asphalt, grass, and other surfaces. The projector can be capable of being attached to, or integrated with various types of machinery, including, without limitation, construction machinery, land, air, and sea vehicles, and other equipment. Warning images can include various image indicia, words, pictures, or other indicia, any of which may be static or dynamic, as appropriate for the system.

In one exemplary embodiment, a safety system is described. The safety system includes an apparatus-mounted projector capable of projecting a warning image onto a designated danger zone about a dangerous implement of the apparatus, wherein the warning image comprises dynamic graphical components. In this embodiment, the safety system can include components for identifying the presence of people or objects within or near the designated danger zone and activate various warning systems accordingly. In this embodiment, such a warning system can include audible annunciators, lights, e.g., strobe lights, or other types of warnings. In one embodiment, helmets, ear muffs, eyewear, and other personal protective equipment can be configured with one or more components for receiving a warning signal transmitted by the warning system. Upon receiving such a warning signal, the one or more components can provide a direct warning stimulus to the wearer, such as an audible alert tone within the ear muffs or helmet, flashing lights within eyewear, or haptic stimulus.

In one exemplary aspect, a system for projecting a warning image onto a surface within a selected danger zone is disclosed. The system includes an optical projection system configured to controllably project a warning image onto a surface that substantially encompasses the selected danger zone. The system further includes an electronic control module configured to control the optical projection system according to an operational state of a machine implement within, or proximal to the defined danger zone.

In one embodiment, the optical projection system is operatively mounted to a mobile apparatus.

In one embodiment, the system is operatively configured for use with an aircraft.

In one embodiment, the projected warning image includes one or more animated image components. In a related embodiment, the defined danger zone is an area proximate to an engine of said aircraft. In a related embodiment, the defined danger zone is an area proximate to a propeller of said aircraft.

In one embodiment, the electronic control module is configured to cause projection of a first warning image according to a first operational state of the implement, and projection of a second, different warning image according to a second, different operational state of the implement. In a related embodiment, the first operational state is a first measured revolutions-per-minute (RPM) value and the second operational state is a second measured RPM value. In a related embodiment, the defined danger zone is different for each of the first warning image and the second warning image. In a related embodiment, the first warning image is a static image and the second, different warning image is an animated image.

In one embodiment, the optical projection system includes a scanning laser assembly configured to engender at least one of static and animated components of the projected warning image.

In one embodiment, the control module includes digital storage for storing retrievable digital image components of the projected warning image. In a related embodiment, the digital image component is at least one of a text, defined shape, or outline component. In a related embodiment, the digital storage includes text image components in a plurality of languages, and the electronic control module is configured to project the warning image including the text components in one of the plurality of languages according to an electronically-determined, geographic location. In a related embodiment, the geographic location is determined by a GPS system.

In one embodiment, the system further includes one or more sensors configured to detect the presence of a subject proximate to the projected warning image. Furthermore, the control module is configured to cause the projection system to project a modified or different warning image if presence of the subject is detected. In a related embodiment, the control module is further configured to activate an audible alarm upon detecting the presence of the subject.

In one exemplary aspect, a method for reducing the likelihood of injury near a mechanical implement is disclosed. The method includes defining an injurious danger area on a surface proximate to the mechanical implement, providing an optical projection system configured to project a warning image on the surface substantially encompassing the injurious danger area, providing an electronic control module in signal communication with the optical projection system and configured to control the projected warning image, and configuring the electronic control module to cause the warning image to be projected on the surface according to an operational state of the mechanical implement.

In one embodiment, the electronic control module is configured to project a first warning image according to a first operational state, and project a second, different warning image according to a second, different operational state of the mechanical implement.

In one exemplary aspect, a safety system for reducing the likelihood of injury around an aircraft engine is disclosed. The safety system includes an optical projection system configured to be mounted to an aircraft frame and project a warning image substantially encapsulating a selected injurious danger area on a surface proximate to the aircraft engine. The safety system further includes an electronic control module in signal communication with the optical projection system and configured to control both projection of, and graphical elements of the projected warning image. The electronic control module is further configured to receive a measurement of an operational state of the engine and cause the optical projection system to project a warning image onto the surface corresponding to the operational state. For a first measured operational state, the warning image includes static image elements and for a second, different operational state the warning image includes animated image elements.

Certain advantages of the systems and methods include providing customizable, high-visibility, pertinent warning indications to humans; providing warning indications having dynamic content for increased awareness of nearby personnel; providing warning indications to mitigate or prevent falls from platforms, open areas or building precipices; providing warning indications projected from a moving platform, so that a danger zone is projected about a target danger area as the machine moves; among others.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

The foregoing summary is illustrative only and is not intended to be in any way limiting. In addition to the illustrative aspects, embodiments, and features described above, further aspects, embodiments, and features will become apparent by reference to the drawings and the following detailed description and claims.

DESCRIPTION OF DRAWINGS

The present embodiments are illustrated by way of the figures of the accompanying drawings, which may not necessarily be to scale, in which like references indicate similar elements, and in which.

DETAILED DESCRIPTION OF ILLUSTRATIVE EMBODIMENTS

Figure 1:
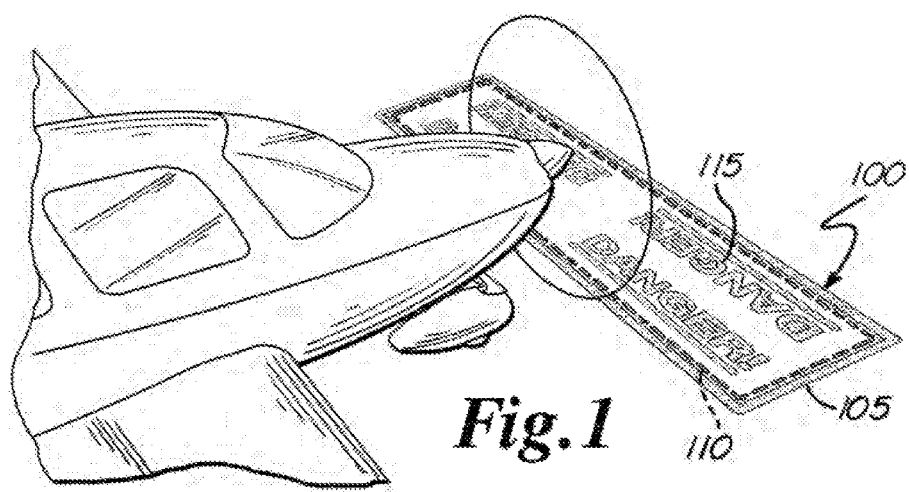
FIGS. 1-2 illustrate exemplary warning images projected by a projection system about a propeller-driven aircraft, according to one embodiment.

Complacency and loss of situational awareness can be a factor in human injury and death in dangerous areas. Particularly dangerous areas include, without limitation, aircraft staging zones, taxiways, ramps, and other airport areas; launch ramps on aircraft carriers; so-called 'pits' used by racecar drivers where cars are serviced during races; and other areas. A commonality between each of these dangerous areas includes the presence of human beings and heavy machinery capable of inflicting serious harm or death to someone in the vicinity.

To reduce the incidence of injury and/or death, zones have traditionally been established by, for example, pavement markings that indicate the possibility of danger within that area; workers are trained to recognize those markings and be cautious around them. However, complacency can have the unfortunate effect of reducing heightened awareness even in zones that have been designated 'dangerous' by people who work in these areas for prolonged periods of time. Furthermore, danger zones are typically established for a given set of routines and, due to their static nature, cannot account for situations that fall out of normal. Consider, for example, a jet pilot who parks at a terminal. The airplane may come to rest, at which time a tarmac worker may begin to chock the wheels. As he moves into a danger zone encompassing the perimeter of the airplane, he may not be aware of a command from a different worker asking the pilot to reposition the airplane which could have devastating effects for the worker now underneath the aircraft. In another example, a tarmac worker may be used to servicing a particular type of jet airplane at his assigned terminal, e.g., a Boeing 727. The worker may not realize—or fully comprehend—the arrival of a bigger jet airplane, e.g., a Boeing 737 having more powerful jets and thus stronger jet intake and/or jet blast. If the worker is unaware of the change in that which he has become accustomed to, he may venture into an expanded danger zone, e.g., the jet intake, which can cause serious injury.

Thus, to provide additional safety and heightened awareness around machinery, in general, systems and methods for projecting warning images onto a surface are disclosed. In one exemplary embodiment, a warning system includes an optical projection system for projecting warning indicia on a surface. An optical projection system can be attached to, coupled, or integrated with a portion of machinery, a vehicle, or any other body in a configuration that provides the capability of optically projecting warning indicia onto a surface. A warning system can be configured according to the type of machinery it operates with and can be further configured to project warning indicia according to any variable or feature of its operation, as described in greater detail herein.

In general, a projected warning image can have a projected surface area or perimeter that substantially encompasses or encapsulates a selected danger zone and serves to provide a warning to persons in the vicinity, for example, that the area is dangerous or is about to become dangerous. A projected warning image can include optically-projected components such as shapes, colors, graphic elements, text, or any other appropriate indicia for warning persons of the danger area, including combinations thereof. As discussed in greater detail herein, a warning system can be configured to project static or dynamic warning images including, words, symbols, or any other type of projectable image components. A projection system used with a warning system can project warning indicia utilizing, e.g., one or more light sources and one or more optical assemblies capable of projecting the image onto a surface with sufficient clarity and intensity to warn persons in the vicinity of the danger area. Examples of suitable light sources include, but are not limited to: lasers, diodes, and incandescent or fluorescent bulbs.

As mentioned previously, a warning system of the type described herein can be configured for use in any industry and with any type of machine. However, for the sake of brevity, this disclosure focuses on implementation with aircraft as one non-limiting, exemplary embodiment. Those skilled in the art will recognize the applicability of the disclosed warning system to other machinery, such as industrial lift trucks, cranes, and construction equipment and service vehicles, including modifications that may be necessary to enable their functionality on other systems, even though they may not be expressly disclosed herein.

Referring now to FIGS. 1-5, various exemplary warning images are shown projected from a warning system according to several embodiments. In these examples, selected danger zones around the propeller of a prop airplane (FIGS. 1-2) and the intake/exhaust areas of a turbine-powered airplane engine (e.g., a "jet") (FIGS. 3-5) are substantially encompassed by a projected warning image. A "selected" danger zone can be, e.g., an identified area around a machine implement such as, without limitation, a propeller, engine or engine component, rotor, or other implement that has the potential to be injurious to a person or animal, or cause damage to other machinery. An exemplary system capable of projecting the warning indicia shown in FIGS. 1-5 is described in greater detail below. FIGS. 1-5 illustrate exemplary warning indicia projections in dangerous areas around aircraft. For example, referring to FIGS. 1 and 2, a spinning propeller at the fore of the aircraft can be difficult to see; thus, a danger zone exists around the propeller.

Figure 2:
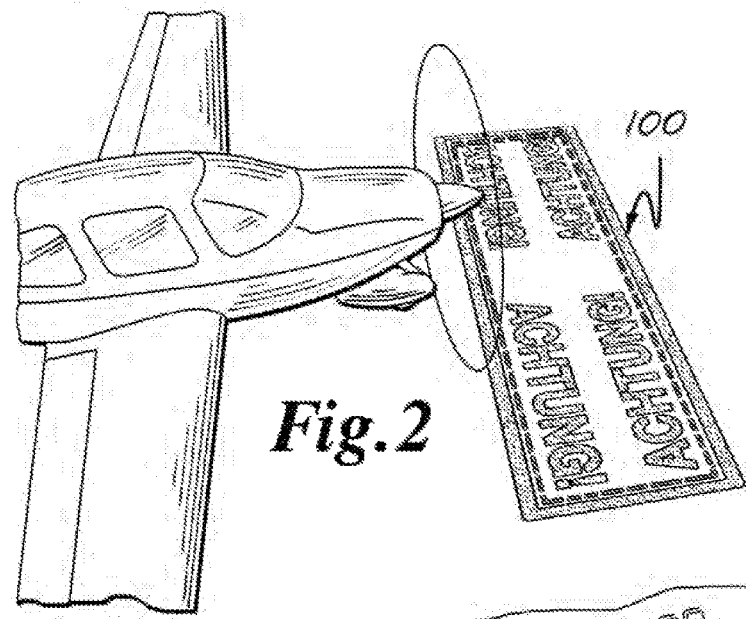

Referring specifically to FIGS. 1 and 2, in this embodiment, a projected warning image 100 includes a plurality of optically-projected warning indicia: a solid box 105; a dashed box 110 within the solid box 105; and the word "DANGER!" 115 in a plurality of orientations as shown. FIGS. 1 and 2 illustrate projected warning indicia as a simple rectangle directly in front of the propeller; however, it will be understood that warning indicia can be projected from one or more optical projection systems such that it appears "wrapped" around the fore of the aircraft, e.g., in a bracket "]" shape, so that the area fore of the wings is designated a warning area (not shown in FIGS. 1-2). In this embodiment, the warning indicia 100 is projected onto a tarmac surface, which can be formed of asphalt, concrete, or other materials as is generally known, by a suitable optical projection system. One suitable and non-limiting optical projection system includes a laser display system having at least one laser head, an optional color separation module, and a scanner assembly configured to project one or more output laser beams to form the warning image 100 illustrated.

In this and other embodiments, projected warning indicia can include one or more brightly-colored elements which can be the same or different color as preferred. In this example, the solid box 105, the dashed line 110, and the words 115 can be bright red. In this and other embodiments, the projection system can be configured to change the color, shape, size, or any other projectable aspect of the warning indicia elements to draw attention to the danger zone.

For example, the warning system can be configured such that the DANGER! element (115) alternates between being projected in bright red and bright green, or is caused to flash intermittently, or a combination thereof. Similarly, in this and other embodiments, the warning indicia elements can be dynamic; for example, elements can move to draw greater attention to the danger zone. For example, in this embodiment, the dashed line 110 can be projected such that it appears to move in a clockwise or counter-clockwise direction about the inner perimeter of the solid box 105, or flash on and off so as to attract attention to the injurious area.

In this and other embodiments, the projected indicia can be associated with an operational state of the airplane. For example, when a pilot or equipment operator energizes the system by turning an ignition key to a pre-ignition state, the warning system can project, e.g., the solid-lined box 105 and the dashed box 110 in yellow, and project the word "Caution." In this example, when the ignition is started, the propeller begins to rotate which causes an immediately injurious zone in front of the airplane; at this time, the projected indicia can turn to all-red, and the word "Danger" and other graphic elements can be projected as illustrated to convey the increased amount of caution warranted around the spinning propeller.

In this and other embodiments, a warning system can be configured to project text of in a chosen language or combination of languages. Referring to FIG. 2, for example, the projected warning image includes text in German. In this and other embodiments, a user can cause the projection system to be displayed in a preferred language, as described in greater detail below, so that, e.g., a pilot can control aspects of the projected warning image when traveling between international destinations.

In this and other embodiments, a warning system can be in signal communication with one or more computer systems to facilitate dynamic functionality. Without limitation, a warning system can be directly coupled with a computer system in known ways, e.g., through the use of cables, fibers or other signal-carrying media; or, alternatively, a warning system can be configured to communicate with one or more computing systems via wireless protocols, e.g., Bluetooth, WIFI, etc. "Computing system" as used herein can refer to computers known in the art, such as laptop or desktop systems, tablets, personal computing devices, cellular phones, or more advanced computing systems integrated into the aircraft, for example. In general, such a computing system has at least a processor, memory, input/output hardware, digital storage, and peripheral components as is known in the art, however, any suitable computing platform can be used as preferred.

In one embodiment, a warning system can dynamically determine a language in the use of projected text based on the location of the aircraft or by selection of a preferred language by the operator. For example, a warning system can be in signal communication with a global positioning system (GPS) which itself can be configured to obtain the geographical location of the airplane. The warning system can also be in signal communication with a computing system capable of accessing a database of native languages based on positioning data provided by the GPS. The warning system can then load or otherwise receive from the computing system, a configuration file specifying the language for projecting text indicia. In such an embodiment, a pilot need not concern himself with manually changing the language of projected indicia; instead, the warning system will automatically compensate based on location and project text indicia in a local language.

In this and other embodiments, projected warning indicia can move along with the object it is being projected from. Keeping with the embodiment illustrated in FIG. 1, the relative position of the warning projection 100 with respect to the airplane can be kept substantially constant, whether the airplane is in motion or standing still. In one embodiment, the projected warning indicia can change depending on whether the object, in this example, the airplane, is in motion. For example, the warning indicia 100 illustrated in FIGS. 1 and 2 can be used while the airplane is at rest, but change to a different projected warning design if the airplane is in motion.

Figure 2A:
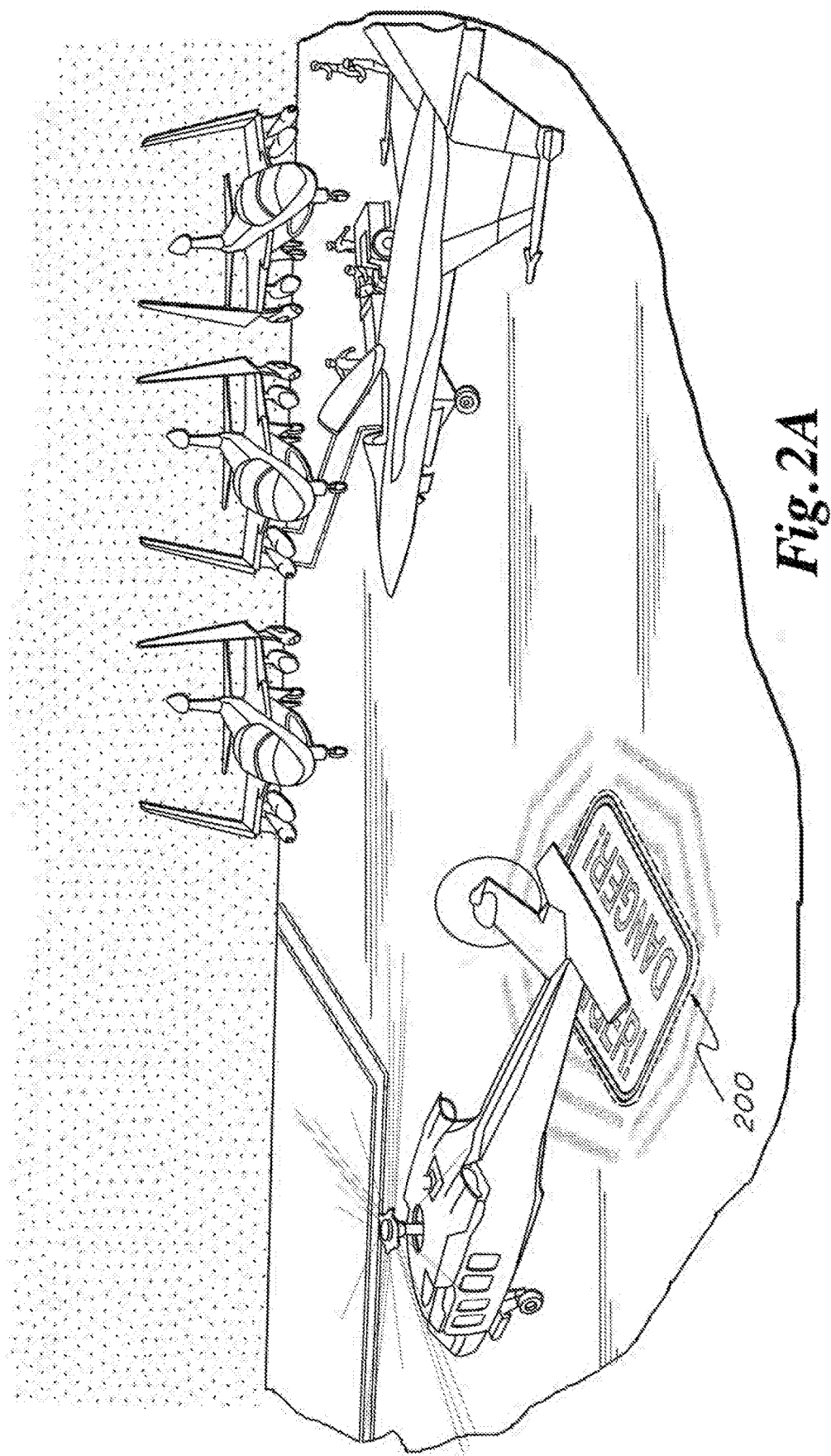
FIG. 2A illustrates an exemplary warning image projected about the tail rotor of a helicopter, according to one embodiment.

FIG. 2A illustrates an exemplary warning image 200 projected about an established danger zone associated with the tail rotor of a helicopter. FIG. 2A illustrates the helicopter on the deck of an aircraft carrier, which is known to be a particularly hazardous environment for workers. In this embodiment, the warning image 200 can be projected when the tail rotor is spinning to visually alert crew members of the danger zone. Like other warning image embodiments, the projected warning image 200 can include static, animated, or static and animated graphic elements, including text, boundaries, shapes, and other elements.

Figure 3:
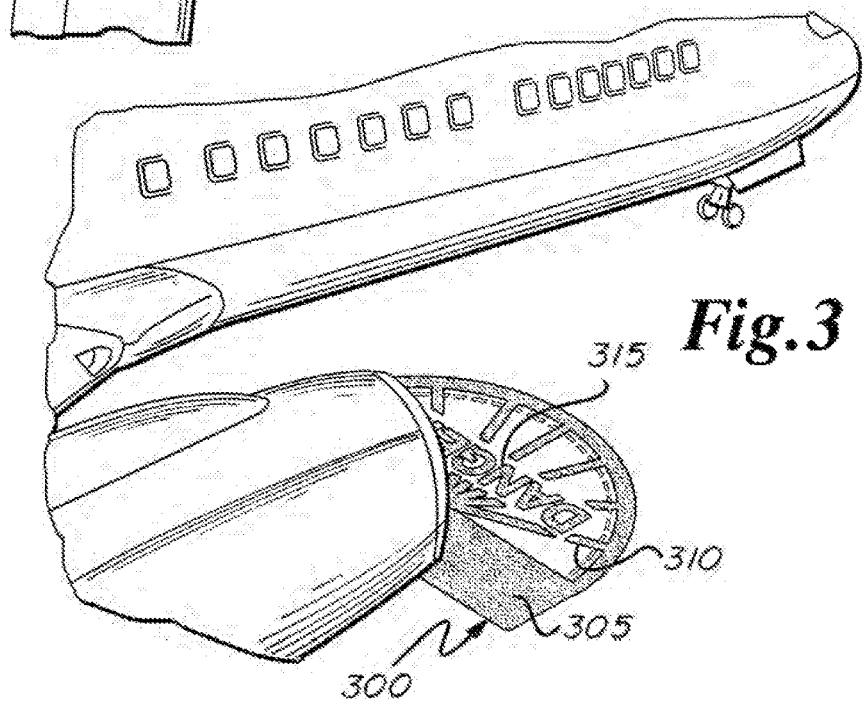
FIGS. 3-5 illustrate exemplary warning images projected by a projection system about a jet engine-driven aircraft, according to several embodiments.
Figure 4:
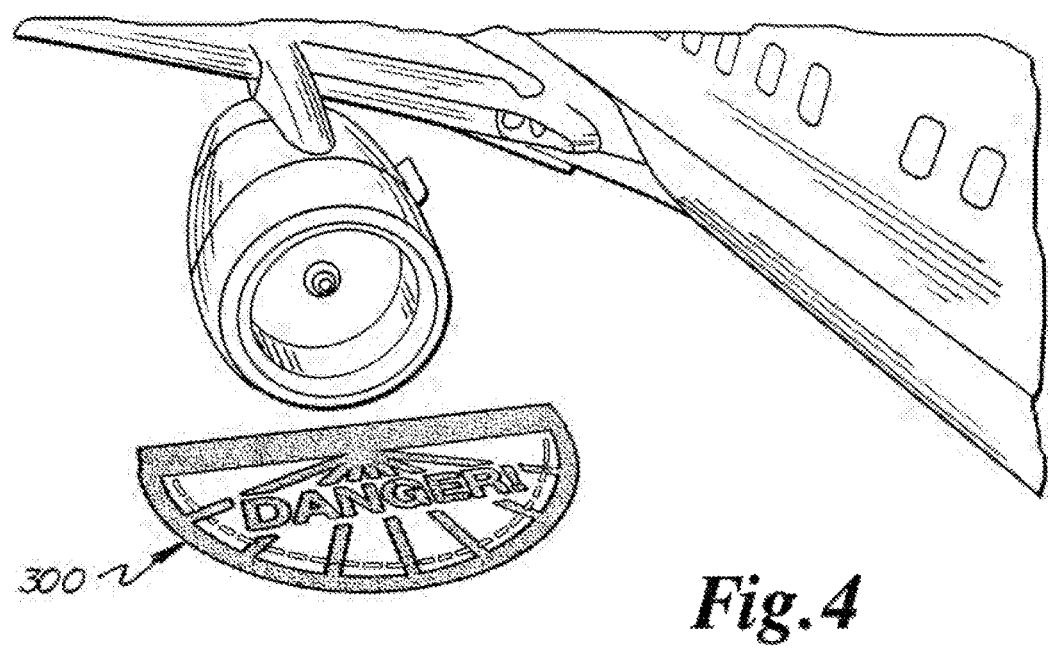

Referring now to FIGS. 3 and 4, in this embodiment, the projected warning image 300 is projected onto an area of tarmac generally encompassing the inlet air stream of a turbine jet engine. Such areas can be particularly dangerous to airport personnel, e.g., ramp agents, ground agents, ground crew, baggage handlers, "marshellers," emergency responders or military personnel and other workers, because the danger is generally invisible, yet a powerful suction force exists that can lift a person into the impeller of the engine. As is often the case, such airport personnel often wear protective hearing devices; so, unlike the case of the airplane propeller previously described which can be at least partially visible, the inlet stream of a turbine jet engine can be particularly dangerous because it can be invisible.

In this embodiment, projected warning image 300 includes a "D" shaped graphic element 305 having a dashed line extending along the curved portion, a plurality of spokes 310, and the word "DANGER" 315 as illustrated. In this embodiment, the dashed line of the D-shaped graphic element 305 can be configured to move in a substantially circular fashion about the inner perimeter; similarly, one or all of the spokes 310 can blink, shuffle, or be projected in other ways so as to draw attention to the warning area.

In this and other embodiments, a projected warning can reflect a state of operation of a machine or vehicle. For example, in this embodiment, the projected image 300 can be projected in a green color when the engine is idling or operating below a selected threshold number of RPMs. As the engine is throttled up and exceeds the selected threshold RPM, the warning image 300 can be projected in bright red or orange, for example. Similarly, in one embodiment, projected text elements, e.g., the word DANGER 315 in the instant warning image 300 can change under similar dependencies. For example, in a low-RPM setting the warning image 300 can contain the word "CAUTION" while in a high-RPM setting, or when the airplane is moving, the warning image 300 can contain the word "DANGER" as illustrated.

Figure 5:
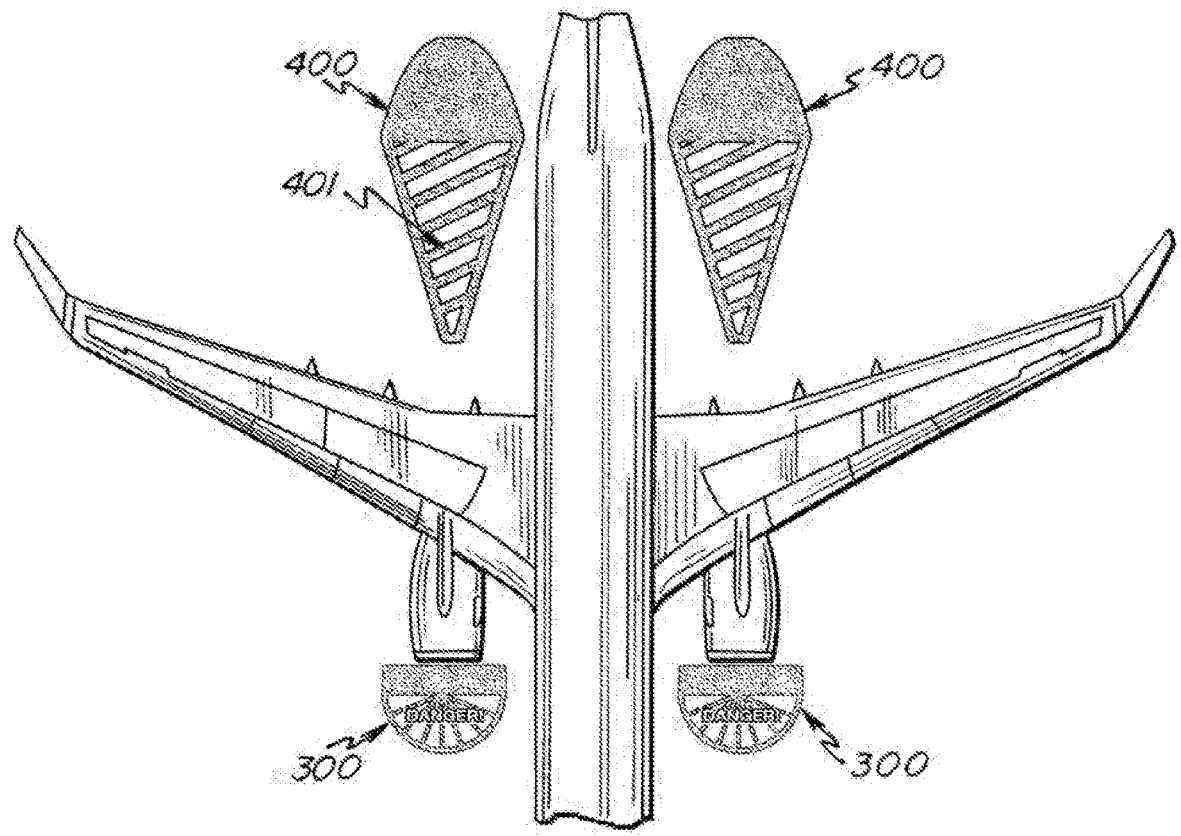

Referring now to FIG. 5, in this example, a projected warning image 300 is projected onto the tarmac, in an area substantially encompassing the inlet air stream of each jet engine fore of the airplane wings. Additionally, aft of the wings of the airplane, a projected jet-blast zone warning image 400 is projected to warn persons of the danger in that area. In this and other embodiments, the blast zone warning image 400 can include animated image components or image elements; for example, the diagonal lines within the cone-shaped image (e.g., diagonal line 401) can be animated to create the appearance that the warning image 400 is rotating, similar to the visual effect of a rotating barber's pole.

In another example, a warning system of the type described herein can be configured to project a first warning image associated with a first measured operational state, and project a second, different, warning image associated with a second measured operational state. In this and other embodiments, the measured operational state can be measured, or received by a warning system control module discussed in greater detail herein. For example, the selected or identified blast zone of a jet airplane idling at 100 RPM may occupy a generally cone-shaped area of 100 ft$^2$. In this instance, the projected warning image can be configured to substantially encapsulate the 100 ft$^2$ cone-shaped area and, if desired, a buffer area that extends a desired distance around the selected or identified blast zone. When the engine RPMs are increased, say to 1000 RPM, for example, the area of the selected or identified blast zone can correspondingly increase. In this instance, the warning system control module can cause projection of a second, different warning image that substantially encapsulates the larger area.

FIGS. 1-5 show non-limiting examples of projected warnings, including warning indicia and text. It should be understood, however, that the style, design, content, and other features of projected warnings may be limited only by practical considerations of projection systems and that many other styles, designs, and warning content are equally contemplated.

Figure 6:
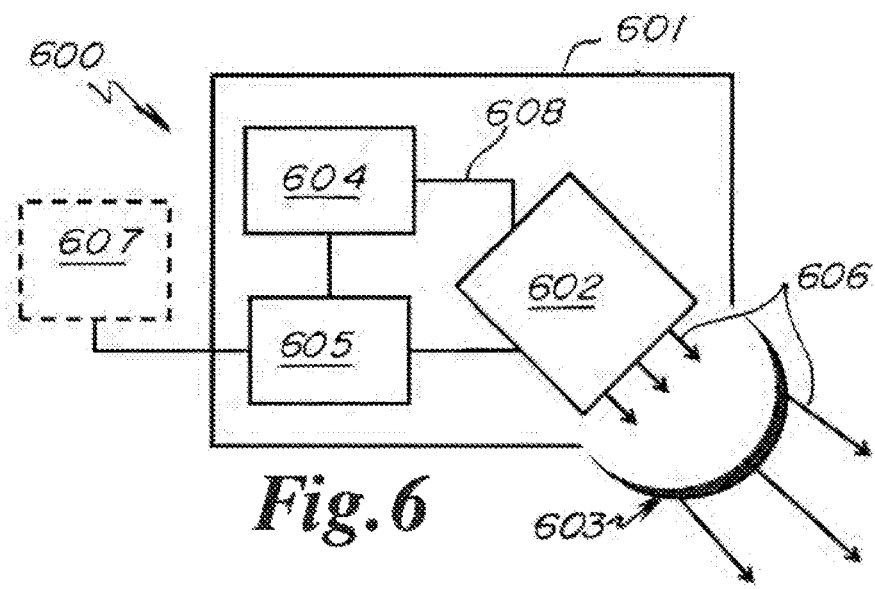
FIG. 6 illustrates a projection system according to one embodiment.

Referring now to FIG. 6, a diagram of an optical warning projection system 600 (hereinafter "projection system") capable of projecting warning images and indicia of the type described herein is shown according to one embodiment. In the description that follows, each component of the system 600 can be, depending on desired functionality, in at least one of data, signal, and power communication with each other, as denoted by the solid connecting lines, e.g., line 608. It should be understood that while the exemplary embodiment of FIG. 6 illustrates components of the system within a single housing, in other, alternative embodiments, one or more of the components of the system can be remotely positioned, e.g., outside of the housing. In such cases, the components can be configured to be in signal communication with each other, as necessary, using cabled or wireless signal connections as desired.

In this embodiment, the system 600 includes a housing 601 for protecting other components of the system 600 as described in greater detail below. The housing 600 can be formed of resilient metals, alloys, plastics, glass, or other components as necessary to protect the system components from weather or physical damage as will be apparent according to the type, purpose, and intended function of the system. For example, if the intended use of the system 600 is on a commercial jet airliner, the housing can be configured as a sealed unit to reduce condensation and other effects that airplanes experience when transitioning from cold to warm temperatures and vice versa.

In this embodiment, a projection system 602 is enclosed in the housing 601. In this and other embodiments, the projection system 602 can be an assembly of optical, mechanical, and electrical components, or any combination thereof, that is capable of, and configured to project the types of warning images and indicia as generally described herein. It should be understood that the type of warning images and indicia illustrated in FIGS. 1-5 are exemplary only, and that the projection system 602 can be capable of projecting a limitless combination of text, images, graphic elements, or other aspects of a desired projectable warning image.

The projection system 602 can be of any type suitable for the intended warning image to be projected and for the surface onto which the image(s) are projected. For example, the projection system 602 can be an assembly that includes, among other components, a light source such as one or more incandescent or fluorescent light bulbs, a laser, a diode, or any combination thereof. The projection system 602 can include various optical, mechanical, electromechanical, or electrical systems, or any combination thereof to engender projection of a desired warning image. For example, the projection system 602 can include components to create "beam" or "screen" effects as is generally known by those skilled in the art of laser light shows and the like. In such a system, the projection system 602 can include, inter alia, one or more: lasers, laser projectors with color controls, beam tables, sub-scanning systems, scanners, graphics systems, and outboard equipment as necessary to be capable of projecting a desired warning image. In this and other embodiments, it should be understood that the phrase "warning image" when used in the context of an image created by a laser display system refers to the image as perceived by a person, as generally such a system builds images through the use of rapidly-scanned laser point projections that move faster than the human eye can detect.

In various embodiments, the projection system 602 can be any type of optical projection system, e.g., a liquid crystal display (LCD) projector, a light-emitting diode (LED) projector, or a digital light processing (DLP) projector. Such projectors are known in the art of, e.g., theater and home-theater systems, and can be selected based on various parameters, e.g., projected brightness, contrast, etc. In some cases a projector can be adapted or configured for adequate intensity, projection, focus, or other aspects when incorporated into a system 600 as described herein. Two exemplary, non-limiting projectors are the PowerLite Pro Cinema 6030UB 2D/3D 1080p 3LCD projector, and the PowerLite Home Cinema 5010e 1080p 3LCD projector, both provided by Epson America Inc., Long Beach, Calif., USA. In various embodiments, the projection system can be configured to be in signal communication with a digital media server which can provide digital images, animations, and other content that can be used in, or as warning images as described herein as part of a warning system, e.g., warning system 600.

In this embodiment, the projection system 602 is configured and oriented so as to project light (illustrated by rays 606) from the projection system 602 through a transmissive window 603. In this embodiment, the window 603 is configured such that the light 606 can be projected onto a selected danger zone area, e.g., an area fore of an airplane propeller as illustrated in FIG. 1 or on fore and aft sides of a turbine jet engine as illustrated in FIG. 5.

In some embodiments, the window 603 can be an optical element capable of providing desired enlargement, distortion correction, focus or other optical adjustments such that the projected warning image appears as desired on an associated surface, such as on an airport tarmac. For example, window 603 can be an optical element that corrects for asymmetrical image skew that can result if the warning image is projected at an angle onto the intended target surface.

In this embodiment, the system 600 includes a power source 604. The power source 604 can be a source of power for the projection system 602, the control module 605, or both. The power source 604 can be in the form of stored energy, e.g., as a battery, or a source of alternating current power, e.g., an electrical bus connected to a power grid (not illustrated in FIG. 6). Such power sources are known in the art and will generally depend on the type of projection system 602 being used.

In this embodiment, the system 600 includes a control module 605, which is described in greater detail herein. In general, the control module 605 provide data, e.g., text, images, graphical elements, and any other desired warning indicia that is projectable by the projection system 602. In some embodiments, the control module can be integrated into, or may come integrated as a package system with the projection system 602.

In this embodiment, the control module 605 can include I/O ports for receiving various types of data that can be projected, or made to be projected by the projection system 602, such as graphics files, text, computer-executable logic instructions, and other data. The control module 605 can further include user controls for controlling or adjusting various aspects of the projected warning image. Exemplary controls include brightness, focus, and color, among others.

In this embodiment, the control module 605 can include a computing system having necessary components for causing a desired warning image to be projected by the projection system 602. The computing system is described in greater detail in FIG. 7; however, its function can be to allow program instructions to be executed that control the projected warning image.

In this embodiment, the control module 605 is in signal communication with a data source 607. Data source 607 can be, e.g., an output terminal of a computing system that senses and monitors various aspects of machine or vehicle use. Such computing systems are known and used, e.g., in cars, work machines, e.g., construction equipment, airplanes, and the like.

Alternatively, data source 607 can be a sensor capable of sensing a chosen condition, state, or aspect such as detecting movement, temperature, speed, or other condition, such as location through use of GPS signals as described herein, or engine RPM as described herein. In some cases, the data source 607 can be capable of transmitting an electronic signal to the control module 605. In some cases, data source 607 can be a sensor capable of returning an electronic condition, state, or aspect in response to a data query sent from the control module 605.

Figure 7:
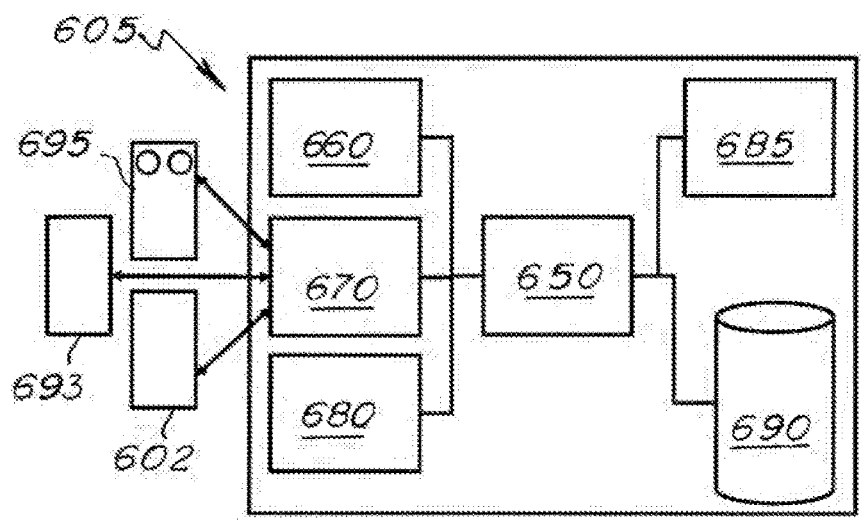
FIG. 7 illustrates a control module of a projection system, according to one embodiment.

Referring now to FIG. 7, control module 605 is illustrated according to one embodiment. It should be understood that the following description of control module 605 is one exemplary configuration of many possibilities as one of ordinary skill in the art of computer design or software engineering will appreciate. Furthermore, for clarity and brevity, only certain control module components are described; other components and peripherals can be added as necessary to achieve additional desired functionality.

In this embodiment, the control module 605 includes a computer processor 650 (hereinafter 'processor'). The processor 650 can be any computer processor capable of performing the function of carrying out logic and control functions, sending and receiving electronic signals, and performing logic and control calculations and determinations, as is generally known in the computing arts. In this embodiment, the processor 650 is in signal communication with a logic module 660 that includes stored instructions for carrying out functions relating to the generation of projected warning images such as those described herein.

In this embodiment, the stored instructions can include, e.g., software and logic instructions to be carried out by the processor 650 according to the type, configuration, and parameters of the projection system 602. For example, in a case where the projection system includes a laser-driven display, the stored instructions can include commands for activating the laser display system, controlling rasterizing components, etc., so that selected warning images are projected.

Additionally, the logic module can include stored instructions for "autonomous" control module functionality. For example, the stored instructions can include logic functions for continually monitoring a state or condition of the data source 607, e.g., engine RPMs, a mass flow sensor reading or other sensor data, selecting an appropriate warning image from a data repository 690 (described in greater detail below), selecting a language of projected text according to location, and causing control signals to be sent to the projection system 602 so as to project the warning image to the danger zone.

In this embodiment, the control module 605 includes an input/output (I/O) module 670 in signal communication with one or more external instruments 693, user controls 695, the projection system 602, and the processor 650. The I/O module 670 can be configured so as to be capable of sending input control signals received from the user controls 695 to the processor 650 for processing. The I/O module 670 can be in signal communication with one or more signal registers, e.g., an output register (not illustrated in FIG. 7) for displaying information on a user interface such as a computer monitor which can be located, e.g., in a cockpit. In one embodiment, the I/O module can be in signal communication with one or more signal broadcasting components, such as a radio, WIFI, Bluetooth or other transmitter for sending information or alert warnings to personnel or other equipment or operators in the vicinity. The I/O module 670 can also be configured to receive image projection signals from the processor 650 and send them to the projection system 602. In this embodiment, the image projection signals can be, e.g., digitized images that the projection system 602 is capable of displaying in a preferred format.

In this embodiment, the control module 605 includes a memory module 680. The memory module can be utilized, e.g., by the processor 650 in carrying out programmatic functions as is generally known in the art. The memory module 680 can be any type of computer memory compatible with the processor 650 and have sufficient storage capability to enable the functions of the processor 650 to occur at a desired rate.

In this embodiment, the control module 605 includes a user interface module 685 and a data repository 690. The user interface module 685 can include necessary hardware and software, including any necessary logic functions, to provide a user interface for creating a desired warning image, selecting a warning image from a previously-created image, manipulating a warning image, or performing other such functions. In this embodiment, warning images can be stored in the data repository 690 and retrieved, e.g., using the aforementioned user interface module 685 or, in a further example, selected by the processor 650 resultant from a determined condition, state, or aspect, e.g., sensed by the data source 607.

In this embodiment, the user interface module 685 can send and receive signals to a user interface, e.g., a computer screen via the I/O module 670 as described herein. Such signals can be graphically represented in a user-friendly form so that the user can manipulate, select, and perform other functions for creating a projectable warning image such as those described herein. In one embodiment, the user interface module 685 can wirelessly transmit and receive signals, e.g., through the Bluetooth protocol, or "WIFI" wireless networking standards to allow a user to access the user interface using a smartphone, tablet, or other personal computing device. In one embodiment, the I/O module 670 can include one or more data receptacles, e.g., a USB port, for connecting to a computing device and receiving projectable warning image data or graphic elements (text, graphics, etc.) that can be used to create a projectable warning image, e.g., through use of the user interface module 685. Such data can be stored in the data repository 690 for use.

Figure 8:
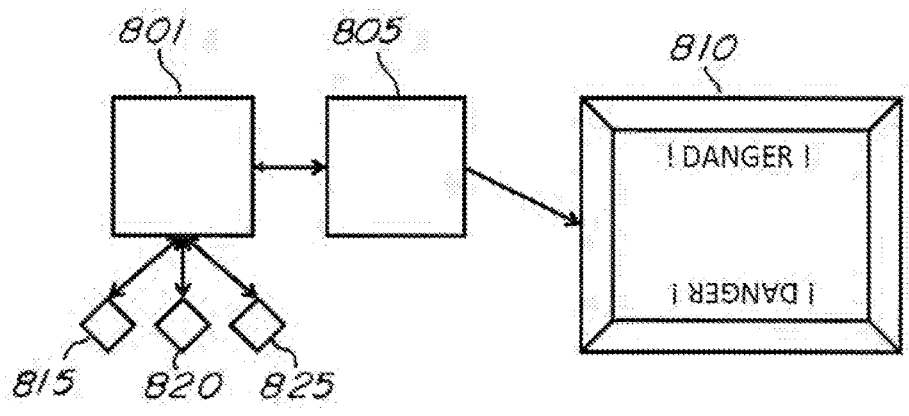
FIG. 8 shows an exemplary warning system according to one embodiment.

In general, existing display systems can be used with, or configured to be used with a warning system of the type described herein. Referring now to FIG. 8, an exemplary warning system utilizing a display system is illustrated according to one embodiment. In this embodiment, the warning system includes a computer control module 801 and a laser-based display system 805 capable of projecting a warning image 810.

In this embodiment, the computer control module 801 can include a processor, memory, I/O ports, and stored logic instructions for gathering data from instruments 815, 820, and 825. It should be noted that three instruments are shown in FIG. 8 for illustration; however, control module 801 can be configured to gather data from any number of instruments, as desired. Instruments 815, 820, and 825 can be any instrument capable of, e.g., obtaining or generating a measurement, or an instrument controlled by a person, e.g., a pilot. Exemplary instruments include, without limitation: a tachometer, a GPS system, an instrument configured to detect an operational state of an engine, an instrument to detect rotation of a propeller or turbine fan, an instrument configured to detect motion, e.g., a gyroscope, accelerometer or other instrument. One exemplary, non-limiting accelerometer for this purpose is provided by Cardinal Components, Inc., Wayne, N.J., USA, Part Number CB-042.

In this embodiment, the laser-based display system 805 is a display unit including any necessary optical elements, drivers, computing components, logic instructions, and other components used to project images, text, and other warning indicia as generally described herein. One non-limiting, exemplary laser-based display system is the LASER- WORLD PRO-1000G ADVANCED system provided by Laserworld USA Inc., Lake Mary, Fla., USA. In one embodiment, commercially-available software and hardware, such as the LASERSHOW DESIGNER 2000 family of software and hardware products provided by Pangolin Laser Systems, Inc., Orlando, Fla., USA can be used to design graphical elements, text, and other indicia used in a warning image that can be stored as logic instructions to be used by the laser-based display system 805. In this embodiment, the laser-based system 805 can also include a hardware board, e.g., a QM 2000 hardware board provided by Pangolin Laser Systems, Inc. (ibid) for performing calculations and storing laser frames and warning image content.

In this embodiment, the computer control module 801 can be configured to collect data from each of the instruments 815, 820, 825; for each instrument, data collection can occur continuously or, alternatively, intermittently, e.g., once every 30 seconds. The computer control module 801 can be configured to analyze data from each instrument to determine if a warning image should be projected. For example, keeping with the aviation examples provided herein, the control module 801 can receive tachometer data indicating that an engine has started, and thus a "Caution" warning image should be projected on the tarmac. Similarly, the control module 801 may receive data that a turbine engine fan is spinning at a threshold value that warrants a "Danger" warning image to be projected on the tarmac.

Once the computer control module 801 determines that a warning image should be displayed, a display activation signal can be sent to the display system 805. The display activation signal can include, e.g., instructions to load preconfigured frames, indicia, words, or other media and project them onto a designated warning area as described herein.

Figure 9:
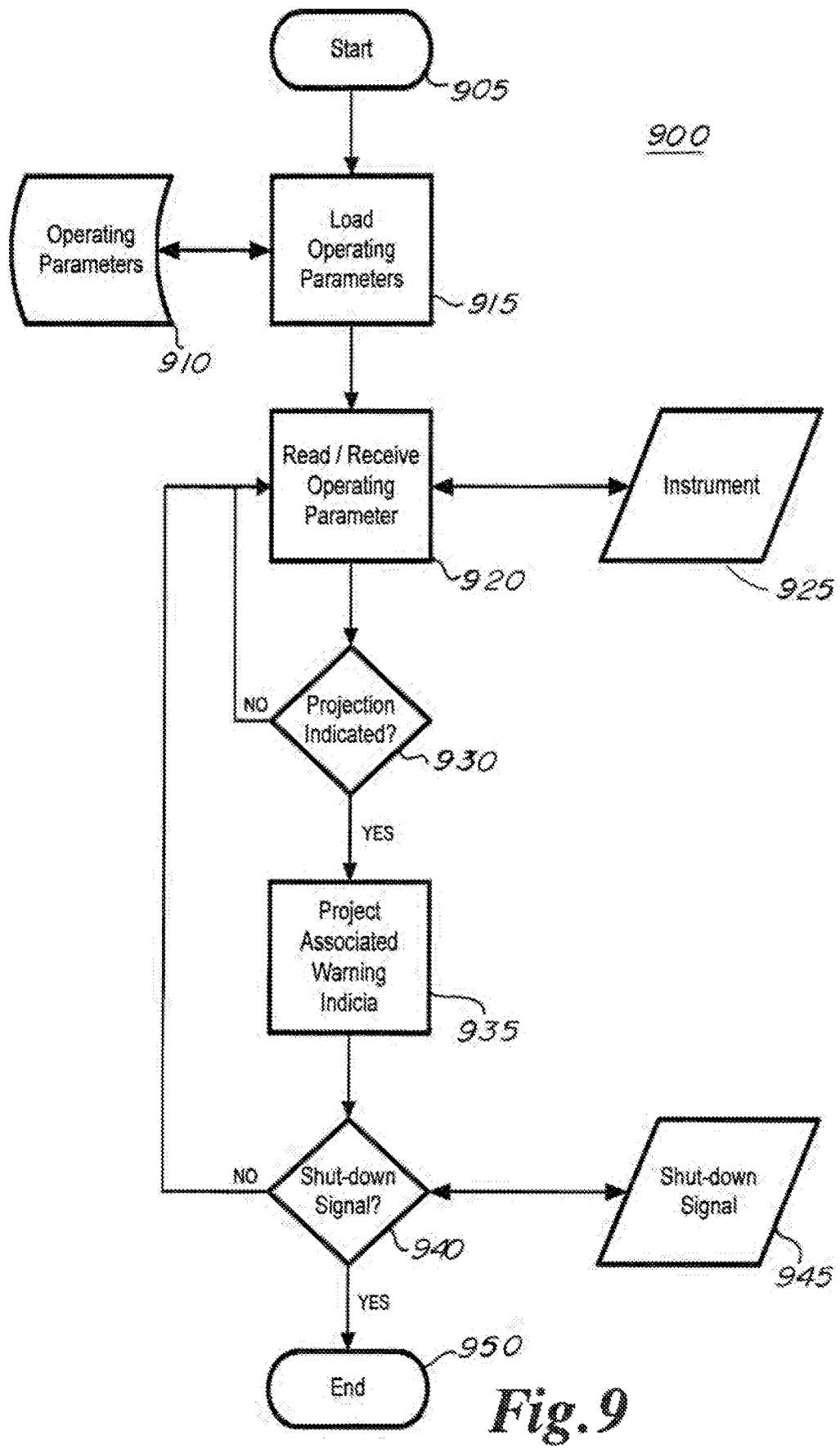
FIG. 9 shows a process diagram according to one embodiment.

Referring now to FIG. 9, a process flow 900 for projecting a warning image is shown according to one embodiment. In this embodiment, the process 900 can implemented by one or more computer processors in signal communication with computer memory, stored computer-executable software instructions, including drivers, and instruments configured to capture data pertaining to an operational state of an airplane component. The process 900 begins at 'Start' step 905, which can include, e.g., providing power to, and initializing the warning system. Next, at step 915, operating parameters can be loaded from, e.g., digital storage (Operating Parameters 910) in addition to any drivers, software, firmware, or other files needed for operation of the system. Exemplary operating parameters can include, for example, communication instructions and protocols for communicating with instruments and projector systems, drivers, firmware, etc. Operating parameters can also include, e.g., user-defined data parameters that trigger the system to project a warning image. For example, a configuration file can include a table of engine RPM values and corresponding instructions that the processor can execute depending on a measured engine RPM value. For example, the configuration file can instruct no warning image to be projected at zero RPM, a 'Caution' warning image to be projected from 1-100 RPMs, and a 'Warning' image to be projected for any measured engine RPM value over 101 RPMs.

Next, at step 920, an operating parameter is read or received from an instrument (925). It should be noted that the instant step is phrased in the alternative, as some instruments are configured to be queried, while others are capable or configured to transmit data without necessarily requiring a query. For example, in some implementations, a tachometer data value can be read directly, whereas determination of location using a GPS locator may require a first query and a subsequent response from the instrument.

Next, at step 930, the operating parameter collected in step 920 can be analyzed to determine whether a warning image should be projected. For example, the operating parameters (910) may include instructions to project a warning image similar to that shown in FIG. 1 when the engine is started. If a projection is not indicated, the process loops back to step 920 where operating parameters are read again; if a projection is indicated, the process moves to step 935 where associated warning indicia are projected, e.g., similar to that shown and described with respect to FIG. 1.

While steps 920-935 in FIG. 9 are presented using 'singular' language, it should be understood that the system can be configured to read/receive operating parameters from multiple instruments, and that, e.g., at step 935, multiple projection systems can be activated or deactivated accordingly. For example, in one embodiment, a jet aircraft can have a dedicated projector for each of a starboard- and port-side engine, and a warning system of the type described herein can be configured such that, at step 920, engine operating parameters are read independently from each engine. Accordingly, a 'Caution,' 'Warning,' or other informational image can be independently projected for each engine depending on a measured operating parameter thereof.

In this embodiment, step 940 monitors for a shutdown signal (945), which can be, e.g., a power-down command resulting from a user wishing to power off the system, e.g., by a push-button or switch. In the absence of such a signal, the process can continually loop back to step 920, constantly monitoring for changing operational parameters measured by the various instruments the warning system is configured to work with. Otherwise, in this embodiment, the process ends at step 950.

In one exemplary aspect, a warning system of the type described herein, e.g., system 600, can be integrated with safety control features that minimize the likelihood of injury if a person approaches the target danger zone. For example, in one embodiment, one or more motion sensors can be placed on a portion of an aircraft and configured to detect motion within, or near a projected danger zone. Upon detecting motion, for example, the sensor can send a panic signal to a receiver that is configured to, or capable of initiating a shut-down sequence to reduce a particular hazard. For example, a motion sensor can be configured to detect motion within a selected danger zone in front of a jet engine, e.g., area 300 in FIGS. 3-5. In some embodiments, the motion sensor can be activated only when the warning is being projected to reduce false panic signals. If motion is detected by the sensor while the projected warning image 300 is active, a panic signal can be sent to a receiver which, in turn can send a shut-down signal to an engine control module. In other words, the detector can act as a "kill switch" if motion is detected within the projected warning area. One non-limiting, exemplary motion detection system for this purpose is the LEDDAR™ Sensor Evaluation Kit provided by LeddarTech Inc., Quebec City, Quebec, Canada.

In one embodiment, an audible alert tone can be generated if motion is detected within, or near a projected warning area. For example, referring back to FIGS. 1 and 2, motion or proximity sensors can be placed on the aircraft and configured to detect motion within the solid box 105. The control system 600 can be configured to activate one or more of an audible alarm, a visual indicator or alarm, or a tactile (haptic) alarm stimulus if motion is detected within the danger zone to alert a person to the hazard. In this and other embodiments, the control system 600 can cause an audible alert to be sounded while concurrently sending a panic or shut-down signal to a controller that controls the dangerous implement, e.g., a propeller or turbine engine. Other types of safety control features can be integrated into a warning system to perform the same or similar functionality, including, without limitation, vibration sensors, optical sensors, including laser-based motion detectors, video equipment, and radar and sonar assemblies.

Figure 10:
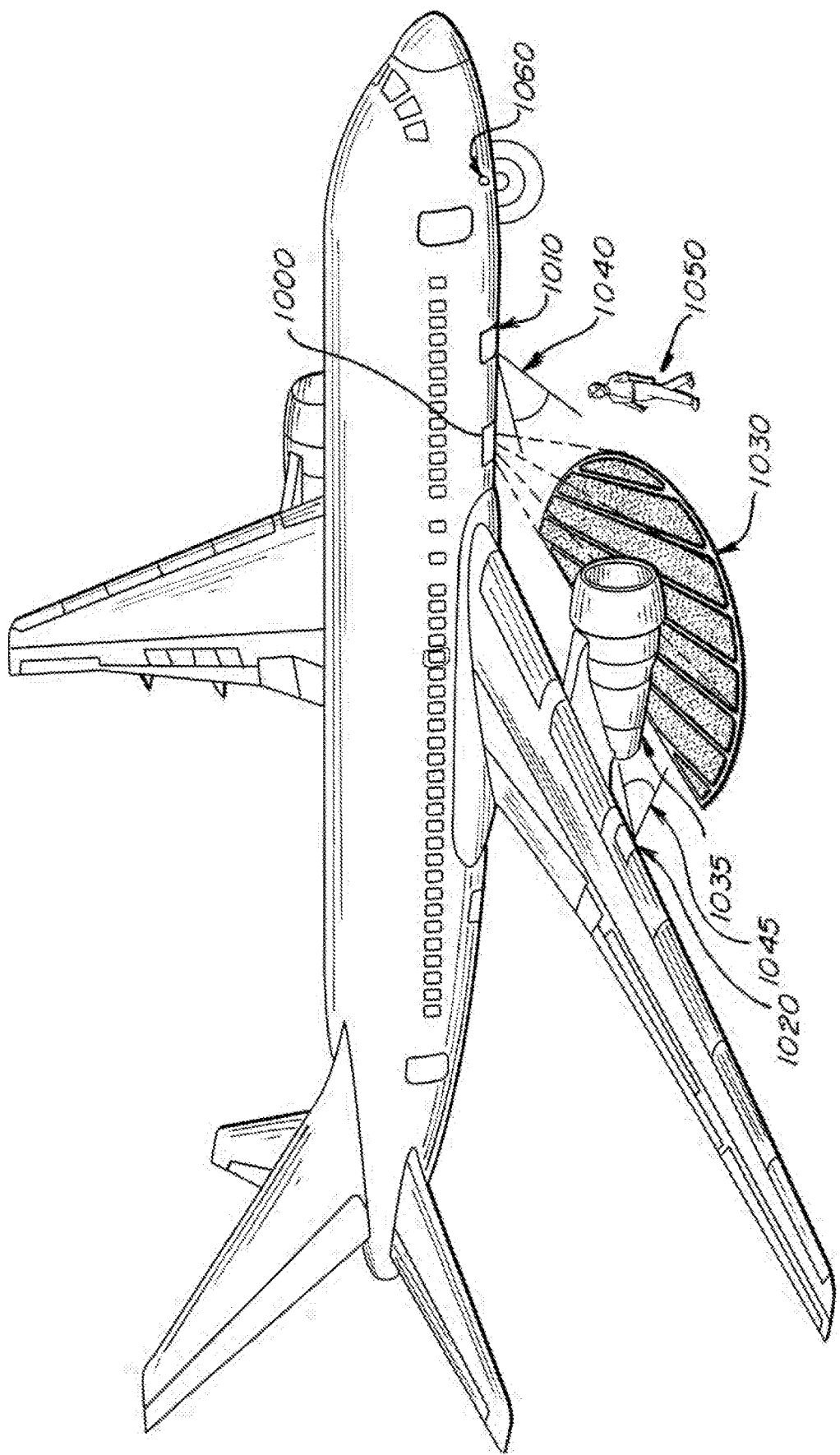
FIG. 10 illustrates a warning system integrated with a jetliner, according to one embodiment.

Referring now to FIG. 10, a jet airplane is illustrated with an integrated warning system of the type described herein. In this example, the jet is configured with a projection system 1000 configured to project a warning image 1030 fore of the starboard engine 1035 as illustrated. The projection system 1000 can be, e.g., the optical warning projection system 600 described with respect to FIG. 6, or any other projection system capable of projecting warning images of the type described herein. Dashed lines emanating from the projection system 1000 illustrate projection of the warning image 1030 onto the tarmac on which the jet is resting. In this embodiment, the projection system 1000 is attached to, or integrated with the fuselage of the aircraft; however, the projection system 1000 can be attached elsewhere as preferred. In this embodiment, first (1010) and second (1020) motion sensors are attached on the fuselage and leading edge of the airplane wing respectively, as shown. In this embodiment, the motion sensors are configured to detect motion within a volume cone defined by angles 1040 and 1045 which can correspond to first and second motion detection coverage areas. In this and other embodiments, the motion detection coverage areas can overlap, if desired or, alternatively, be configured to detect motion in selected, non-overlapping areas.

FIG. 10 illustrates a worker 1050 who is about to wander into the danger zone defined by the projected warning image 1030. Motion sensors 1010 and 1020 monitor the area generally in and around the projected warning image 1030 and, when motion of the worker 1050 is detected therein from either or both sensors, an alert signal is sent to cause annunciator 1060 so sound an audible warning alert.

In this and other embodiments, sensors, e.g., motion, sound, video, or other forms configured to detect motion in or around a projected danger zone, can be in signal communication with the warning system control module, e.g., control module 605, so that detection of motion can also cause a change in the projected warning. Keeping with the current example, detection of worker 1050 by sensors 1010 and/or 1020 can trigger control module 605 to "blink" the projected warning image 1030 on and off or otherwise modify the projection of the warning image so as to heighten awareness of the hazard area. Such actions can be in addition to triggering one or more of audible alerts, visual alerts, haptic or tactile alerts, and triggering a panic signal to shut down the engine, apply an emergency implement brake, or other actions as desired to reduce the likelihood of injury to worker 1050 or damage to other vehicles, equipment or personnel.

In one embodiment, a warning system of the type described herein can be integrated with one or more broadcast components to send a warning alert to a receiver. In one embodiment, such a receiver can be integrated into various types of clothing, personal protective equipment, vehicles, and other objects which can be remote from the area in which the warning system is located.

For example, in one embodiment, receivers can be integrated into headphone sets used for ear protection at airports. The receivers can be configured to receive broadcast warning signals transmitted from a broadcast component in signal communication with the warning system control module, e.g., control module 605. Exemplary broadcast components include, without limitation, RF, WIFI, Bluetooth™ and other emitters. Such a configuration provides the capability of transmitting a warning signal to the receiver alone, or in combination with other alert signals, such as the aforementioned audible alert or modifying the projection of a warning image when motion is detected in, or near the vicinity of a projected danger zone. The receiver can be configured with an annunciator that sounds within the headphones if the wearer ventures near the projected warning area to provide an audible, visual, tactile, or combination of sensory stimuli to indicate impending danger. It should be understood that such receivers can be integrated into any type of personal protective equipment and configured in such a way as to provide visual, audio, haptic, or a combination of such stimuli to the wearer.

In one general aspect, it is known that airport tarmacs, runways, taxiways, etc. are comprised of different materials at different airports, or within different zones of a given airport. For example, a jet may take off at an airport having concrete ramps, which can have a generally light color, and land at an airport having ramps formed of asphalt, which can be generally dark in color. Thus, in some embodiments, a warning system of the type described herein can additionally include optical components in signal communication with computer hardware and software components configured to determine one or more optimal optical projection parameters through image analysis.

In such an embodiment, one or more optical components, e.g., a camera or video assembly can be configured to capture an image of the intended projected danger zone, e.g., projected warning image 300 on the tarmac in FIGS. 3-5. The image can then be analyzed by image analysis software to determine whether the warning image is adequately visible on the surface onto which it is projected. In one embodiment, the image analysis software can be configured to receive the intended projected warning image as a template file so that image analysis can be performed to find a match with the captured image. Next, the captured image can be analyzed to determine whether the warning image is sufficiently contrasted against the background, in this example, the tarmac. If not, the control module of the warning system can alter the projected warning image so that it is more visible, e.g., to be brighter, to be of different color or combination of colors, etc. In one embodiment, the control module can cycle through a variety of projection parameters, e.g., brightness, color, etc., where an image analysis is performed after each iteration to find the best visibility parameters. One non-limiting, exemplary software package for image analysis is provided by Teledyne DALSA, Waterloo, ON, Canada, under the SAPERA™ VISION SOFTWARE brand.

Figure 11:
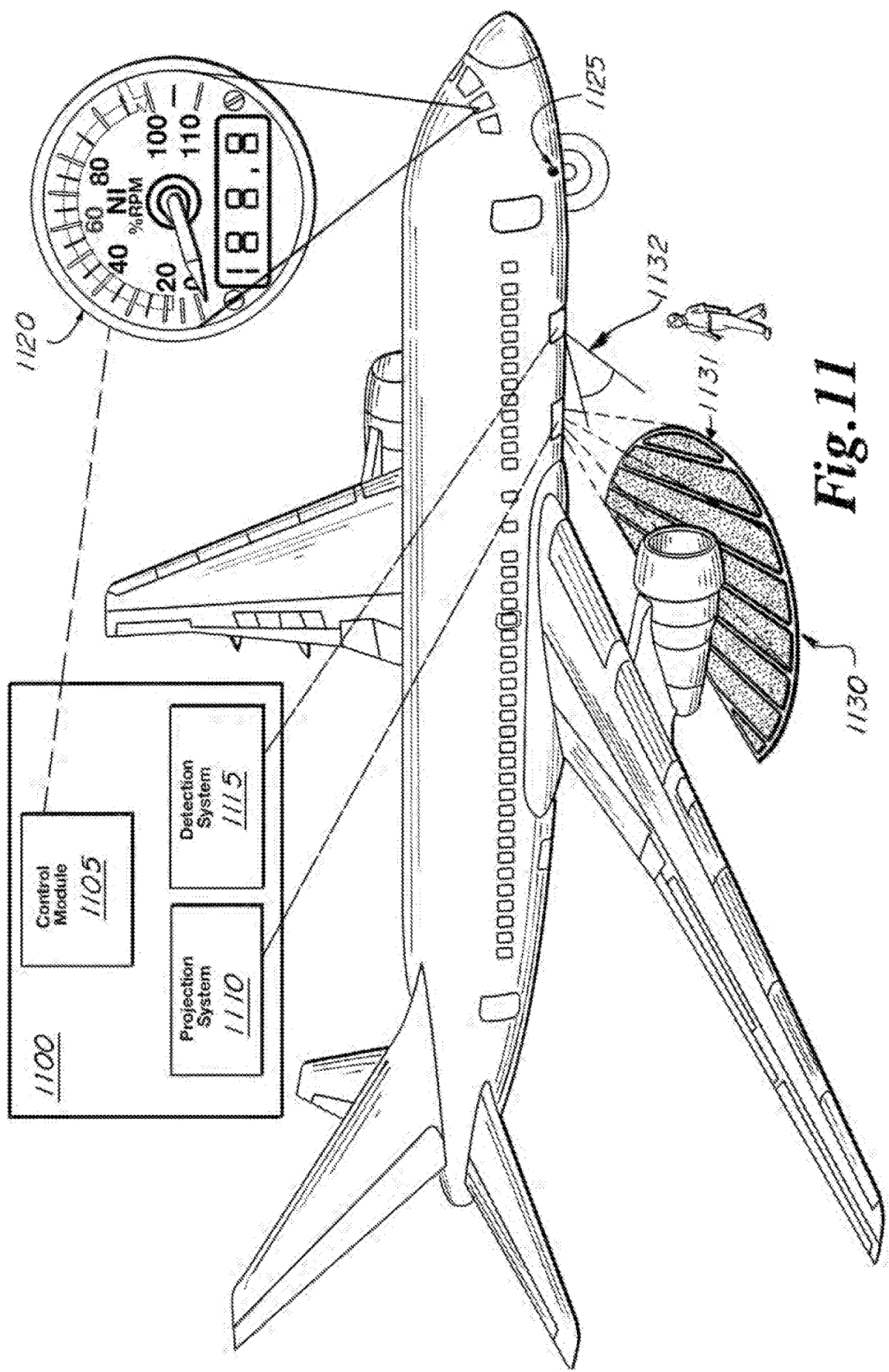
FIG. 11 illustrates a warning system integrated with a jetliner, according to one embodiment.

Referring now to FIG. 11, a warning system 1100 is illustrated according to one embodiment. In this embodiment, the system 1100 includes an electronic control module 1105 in signal communication with a projection system 1110 and a detection system 1115. FIG. 11 illustrates that various components of the system 1110 can be located apart from one another throughout a machine, in this example, an airplane. In this embodiment, the control module 1105 is in signal communication with an instrument of the airplane, in this example, an RPM gauge 1120. It should be understood that, in this and other embodiments, the control module need not necessarily be in signal communication with RPM gauge 1120 itself; rather, the control module can be in signal communication with a component that measures engine RPM and communicates that value to the gauge 1120.

In this embodiment, the control module can be one as described herein, and is configured to receive an operational state of the airplane implement, in this example, the RPM value of the turbine fan of the engine. Near to the turbine fan of the engine, a danger zone 1130 has been established. The danger zone can be determined by any desired method; for example, in this case, wind or vacuum measurements can be taken at various engine RPMs to determine levels that may pose a danger to personnel in the vicinity of the engine. Such dangers can include, e.g., being drawn into the turbine fan, tipping of equipment, etc.

In this embodiment, projection system 1110 can be one as described herein and is configured to project a warning image 1131 that overlaps or encapsulates the danger zone 1130. Thus, in the illustration of FIG. 11, the danger zone 1130 and the warning image 1131 overlap.

In this embodiment, detection system 1115 can be one as described herein and is configured to detect the presence of objects, e.g., personnel, within or near the danger zone 1130. In this example, the detection system 1115 can include one or more motion sensors disposed on the frame of the aircraft and configured to focus its detection mechanism on or about the danger zone 1130 as illustrated by angle indicator 1132.

In this embodiment, control module 1105 continually monitors the operational state of the engine RPMs as expressed by gauge 1120. Control module 1105 can be configured to compare the measured engine RPM value with a digitally-stored table that includes stored threshold RPM values; the control module can then command the projection system 1110 to project warning image 1130 upon receiving an RPM value at or above a threshold value. Similarly, the control module 1105 can command the projection system 1110 to deactivate the projection system 1110 if the measured RPM value falls below a threshold value. While FIG. 11 illustrates monitoring a single instrument, it should be understood that control module 1105 can be configured to monitor any desired number of instruments for any desired parameter that may present a hazardous condition.

In this embodiment, detection system 1115 continually monitors for the presence of an object within and around the danger zone 1130. Upon such detection, a motion-detection signal is sent to the control module 1105 which, in turn, activates annunciator 1125. Annunciator 1125 is configured to provide an audible alert near the danger zone 1130 so that personnel are likely to hear it. In this and other embodiments, any number of additional warning signals can be used to alert persons of danger, for example, strobe lights can be activated. In some embodiments, personnel can have on their person, or integrated into personal protective gear, warning signal receivers that receive a transmitted warning signal which causes activation of sound, light, haptic, or other stimuli to warn them of impending danger. In such an embodiment, the control module 1105 can be in signal communication with one or more transmitters disposed on or about the machine, e.g., radio, WIFI, Bluetooth, or other transmitter (not illustrated in FIG. 11) and can cause a warning signal to be emitted therefrom which is receivable by the warning signal receivers.

In one embodiment, the control module 1105 can be configured to only activate the projection system 1110 if a combination of signals is received. For example, to prolong the lifetime of the projection system 1110, the control module 1105 can be configured such that warning image 1131 is projected only when an engine RPM value exceeds a threshold value as discussed, and an object has been detected by the detection system 1115 within or near the danger zone 1130.

A number of illustrative embodiments have been described. Nevertheless, it will be understood that various modifications may be made without departing from the spirit and scope of the various embodiments presented herein. For example, a warning projection system, e.g., system 600 as described herein, can be attached to, or integrated with all types of aircraft, including unmanned aerial vehicles, helicopters, jets, and prop-driven aircraft; tugs and tow motors, hovercraft, motor vehicles, construction equipment, industrial equipment, e.g., forklifts, scissor lifts, hoists, etc., automobiles, trucks, commercial vehicles, commercial airplanes, ambulances, fire trucks, police cars, and other machinery so as to provide the capability of projecting warning images onto a target danger zone, as generally described herein.

While the foregoing description generally describes projection of a warning image defining a hazard inside the boundary of the image, it should be understood that a warning image can similarly be configured to define a hazard outside the perimeter of the warning image. For example, a warning system of the type described herein can be used on a school bus, where the system is configured to monitor the open or closed state of a door where children enter and exit. A projection system of the type described herein can be mounted near the door, and a warning image can be projected on the ground defining a corridor within which children or other passengers should stay when entering or exiting the bus. Thus, in this embodiment, the warning image defines a 'safety' corridor, where the hazard (e.g., traffic) may exist outside of the projected image. Accordingly, other embodiments are within the scope of the following claims.

What is claimed is:

1. A system for projecting a warning image onto a ground surface within an identified danger zone of a vehicle; comprising:
    an optical projection system configured to controllably project a warning image onto said ground surface that substantially encompasses said identified danger zone;
    an electronic control module configured to control said optical projection system according to an operational aspect of a mechanical or electronic component integral to said vehicle;
    wherein said optical projection system is configured to measure a visibility factor of said projected warning image on said ground surface.

2. The system of claim 1, wherein said system for projecting a warning image onto a ground surface within an identified danger zone of a vehicle further comprises:
    a detection system configured so as to capture an image of said selected danger zone.

3. The system of claim 2, wherein said electronic control module is configured to control the intensity of light projected from said optical projection system.

4. The system of claim 2, wherein said electronic control module is configured to determine said contrast value continuously or intermittently.

5. The system of claim 2, wherein said detection system is further configured to determine a contrast value of said projected warning image against said ground surface.

6. The system of claim 1, wherein said visibility factor is a contrast of said projected warning image against said ground surface.

7. The system of claim 5, wherein said detection system is configured to transmit said determined contrast value to said electronic control module.

8. The system of claim 5, wherein said electronic control module is configured to increase said light intensity if said determined contrast value is less than a pre-selected contrast threshold value.

9. The system of claim 5, wherein said electronic control module is configured to alter a color of said projected warning image if said determined contrast value is less than a pre-selected contrast threshold value.

10. The system of claim 5, wherein said electronic control module is configured to blink said projected warning signal if said determined contrast value is less than a pre-selected contrast threshold value.

11. The system of claim 1, wherein said detection system is configured to activate a warning annunciator if motion is detected within said identified danger zone.

12. The system of claim 5, wherein said electronic control module is configured to activate a warning annunciator if said determined contrast value is less than a pre-selected contrast threshold value.

13. The system of claim 1, wherein said vehicle is an aircraft or drone.

14. The system of claim 1, wherein said vehicle is a train, bus or automobile.

15. The system of claim 1, wherein said electronic control module is configured to transmit a shut-down signal if motion is detected within said identified danger zone.

16. The system of claim 1, wherein said electronic control module is configured to cause said optical display system to project a first warning image according to a first operational aspect of said vehicle, and a second, different warning image according to a second, different operational aspect of said vehicle.

17. The system of claim 16, wherein said operational aspect is a measured engine RPM value.

18. The system of claim 1, wherein electronic control module is configured to select said projected warning image based on a determined location of said vehicle.

19. The system of claim 18, wherein said electronic control module comprises a data repository of projectable warning images having warning images and text in a plurality of languages.

20. The system of claim 1, wherein said electronic control module is configured to cause said projected warning image to be displayed in a language based on a determined location of said vehicle.

* * * * *